United States Patent [19]

Pelzer

[11] Patent Number: 5,256,250
[45] Date of Patent: Oct. 26, 1993

[54] THIN FILM EVAPORATOR

[76] Inventor: Rudolf Pelzer, Auf der Pief 37, Herzogenrath, Fed. Rep. of Germany

[21] Appl. No.: 916,411

[22] Filed: Jul. 20, 1992

[30] Foreign Application Priority Data

Jul. 23, 1991 [DE] Fed. Rep. of Germany ....... 4124337

[51] Int. Cl.$^5$ .............................................. B01D 1/22
[52] U.S. Cl. .................... 159/6.3; 159/43.1; 159/49; 202/236; 202/238; 203/89
[58] Field of Search ............... 159/6.3, 49, 43.1, 28.1, 159/6.1, 6.2; 202/238, 236, 237; 203/89; 165/911, 914

[56] References Cited

U.S. PATENT DOCUMENTS

| | | | |
|---|---|---|---|
| 1,795,495 | 3/1931 | Lavett | 210/199 |
| 3,261,391 | 7/1966 | Gudheim | 159/6.3 |
| 3,349,828 | 10/1967 | Monty | 159/6.3 |
| 3,396,088 | 8/1968 | Bechard | 202/238 |
| 3,464,478 | 9/1969 | Ueda et al. | 159/6.3 |
| 3,474,764 | 10/1969 | Sargeant | 159/6.3 |
| 3,634,042 | 1/1972 | McCown | 159/6.3 |
| 3,891,495 | 6/1975 | Baird | 159/6.3 |
| 3,897,218 | 7/1975 | Busweiler | 159/6.3 |
| 3,970,510 | 7/1976 | Nakai | 159/6.3 |
| 3,976,431 | 8/1976 | Boggs et al. | 157/6.3 |
| 3,985,606 | 10/1976 | Band et al. | 159/6.3 |
| 5,028,297 | 7/1991 | Bracken | 159/6.3 |

FOREIGN PATENT DOCUMENTS 1090637 10/1960 Fed. Rep. of Germany .
1619737 1/1971 Fed. Rep. of Germany .
1110573 2/1956 France .

Primary Examiner—Virginia Manoharan
Attorney, Agent, or Firm—Davis Hoxie Faithfull & Hapgood

[57] ABSTRACT

In a thin film evaporator for the evaporation of solutions, colloids, suspensions, or the like, to concentrates, which has a heatable cylindrical evaporator casing coupled with a rotary drive, which evaporator casing has a feed inlet at one end, in the form of a feed distributor that runs on bearings and is coupled with a rotary drive, and at the other end has a concentrate discharge, the axis of the evaporator casing is arranged horizontally. The distal end of the feed distributor can reach the inside surface of the evaporator casing to within less than 2 cm. Wiper elements can work together with the effective surface of the evaporator casing. This thin film evaporator makes possible an optimal setting of the retention time of the process material to be treated in the evaporator casing and has the effect that the thickness of the layer of the process material changes very little over the entire axial length.

5 Claims, 2 Drawing Sheets

THIN FILM EVAPORATOR

FIELD OF THE INVENTION

The invention concerns a thin film evaporator for the evaporation of solutions, colloids, suspensions, or the like, to concentrates, with a heatable cylindrical evaporator casing, coupled with a rotating drive, which has at one end a process material feed in the form of a feed distributor that is coupled with a rotating drive and runs in a rotating bearing, and at the other end a concentrate discharge.

With one thin film evaporator of this kind (DE-AS 1 090 637) the arrangement is, with a vertical version, to make the evaporator casing conical or cylindrical. In the horizontal version a conical evaporator casing is regarded as essential.

Difficulties arise, especially in the treatment of feed stock of low viscosity, because the optimal retention time for each process material can only be attained if the evaporator casing is made in the corresponding length, on account of the strong force that acts on the process material in parallel with the evaporator wall. In that well known thin film evaporator, furthermore, it turns out that there is a marked decrease in the thickness of the process material layer in the direction of flow, especially with the conical version of the evaporator casing. That causes the thermal relationships, which depend on the thickness of the layer, to change sharply over the length of the evaporator casing. It follows that the thermal relationships can, in each case, only be optimal over a small section. In addition, a conical evaporator mantle, which, according to the state of the art, is regarded as necessary for the horizontal execution, is rather expensive to manufacture and requires a relatively high volume, in which to install it.

SUMMARY OF THE INVENTION

The purpose of the invention under consideration here, is to fashion a thin film evaporator, as described at the beginning, in such a way that it makes possible longer retention times with the same length of the apparatus, and at the same time holds the thickness of the layer approximately constant over the total distance traveled.

The thin film evaporator described at the beginning solves this purpose by having the rotational axis of the evaporator casing run horizontally, and by having a vapor exhaust.

In this thin film evaporator, the centrifugal-hydrostatic force necessary for the movement of the process material along the evaporator casing results only from the quantity of the stock fed, the revolutions per unit time of the evaporator casing and from its diameter. This means that the force appropriate for the transport of any process material and its retention time can be simply adjusted by means of the rotational speed. Experiments have shown that the thickness of the layer is quickly reduced in the area of the feed inlet, and that subsequently only a small further reduction of the thickness of the layer takes place, so that, accordingly, the thickness of the layer remains approximately constant over the entire axial length of the evaporator casing. In contrast to the concept of this invention, the well known thin film evaporator cited above has it so that the effective force component for the transport of the process material in the axial direction is determined not only by the speed of revolution but also decisively by gravity. In addition, in the case of that well known thin film evaporator, with the conical version of the evaporator mantle, a reduction of the thickness of the layer over the entire radial length results from the fact that the circumference of the evaporator mantle increases in the direction of the process material movement. Furthermore, the increase of the circumference causes a component of the centrifugal force to act parallel to the mantle, which grows steadily with the circumference, so that, with this well known evaporator, there must be an extreme decrease in the layer thickness over the entire axial length. This is accompanied by an extreme increase in the axial speed of flow of the process material, which necessarily leads to a very short retention time of the material on the evaporator mantle.

The evaporator casing can be heated especially from the outside by means of condensing steam, or from the outside by means of hot liquid jets hitting the casing without direction, or by means of infrared heating.

The thin film evaporator according to this invention can further be arranged so that the feed distributor's distal edge approaches the inner surface of the evaporator mantle to within less than 2 cm. The process material can therefore be given a circumferential speed by the radially outer edge of the feed distributor, which corresponds to the circumferential speed of the evaporator casing, definitely, for example, by the use of radially affixed fins. And by that means again it can be assured that the flow of the process material on the evaporator casing essentially proceeds along an axial line along the casing. By deliberately creating a difference between the circumferential speeds of the separately driven feed distributor and the evaporator casing, one can cause a specific spiral-shaped course of feed distribution over the casing, in order to determine, by this means, the form of the movement and thereby the retention time on the evaporator casing.

The thin film evaporator according to this invention can further be arranged so that the feed pipe runs through the feed distributor and the evaporator casing, at its distal end, runs on bearings on this pipe.

The thin film evaporator according to this invention can further be arranged so that the feed distributor has a floor plate and a conical, corresponding cover plate, and that the floor plate and the cover plate form a radially exterior ring opening. By forming such a ring opening in the feed distributor, the transition of the process material into the evaporator casing is even more precisely performed and more exactly controlled.

The thin film evaporator according to this invention can further be arranged so that, coaxially inside the evaporator casing, there is a rotating member which can be coupled with a drive, and which carries attached at least one wiper element which touches the radially interior surface of the evaporator casing. With such a wiper element it is possible to even more precisely control the shape of the process material stream and with that the retention time too. In addition, such a wiper element ha the effect of keeping the evaporator casing clean and can contribute to the stirring of the process material layer, and thereby to an increase in heat transfer.

The thin film evaporator according to this invention can further be arranged so that the evaporator casing and the rotating member are joined to a common drive by means of a planetary gear. This makes for an exceptionally advantageous solution with respect to the drives of the evaporator casing and the rotating member.

The thin film evaporator according to the invention can further be constructed in such a way that the respective numbers of revolutions of the two drives in the planetary gear can be set in their relation to each other. This setting makes possible the optimization of the relationship of the revolutions to each other, or rather the difference in the number of revolutions, and therefore also the optimization of the shape of the stream of the process material on the evaporator casing.

Finally, the thin film evaporator according to this invention can be constructed in such a way that the feed distributor is in fixed relation, rotation wise, to the rotating member. This offers a relatively simple construction solution which makes possible the steering of the transfer of the process material from the feed distributor to the evaporator casing, without further construction features.

In the following part of the description we show, by means of diagrams, two methods of execution of the thin film evaporator according to this invention.

DETAILED DESCRIPTION

Figure 1:
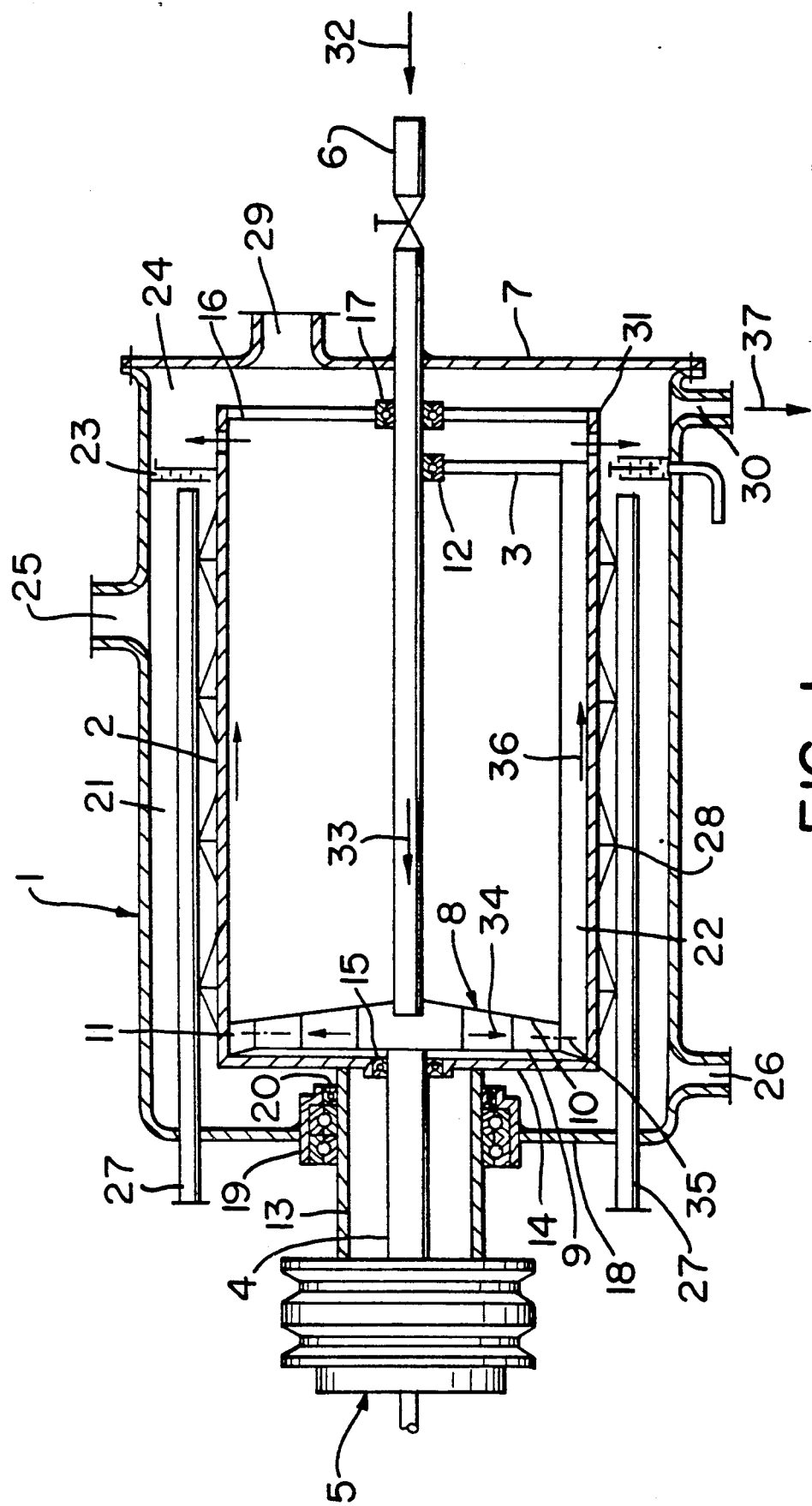
FIG. 1 shows the first method of execution of the thin film evaporator according to this invention, which works with a liquid or vapor-form heating medium.

In the case of the thin film evaporator according to FIG. 1, there is a cylindrical evaporator casing 2 which runs on bearings, inside a housing 1. Coaxially with casing 2, as shown in FIG. 1, bottom, there can be a cylindrical rotating body 3, which also runs on bearings. The common axis of evaporator casing 2 and rotating body 3, as long as the latter is there at all, runs horizontally. The rotating body 3 is connected to the central shaft 4 of a planetary gear 5. Coaxially with the central shaft 4, a feed pipe 6, for the process material that is to be evaporated, enters from the opposite end of the evaporator casing, through a face 7 in the housing 1, into a feed distributor 8. This feed distributor 8 has a floor plate 9 which is fixed to the central shaft 4. The floor plate 9 acts as a part of the rotating member 3, if such a member is provided. The feed distributor 8 also has a coaxial, conically designed cover plate 10. Floor plate 9 and cover plate 10 form a radially exterior ring opening 11 for the release of the process material from the feed distributor 8 At its opposite end, the rotating member 3 runs on a bearing 12 on the feed pipe 6.

The evaporator casing 2 is connected with the planetary gear 5 by way of a hollow shaft 13. The central shaft 4 goes through the center of a face 14 on the drive side of the evaporator casing and made leakproof by a seal 15. The seal 15 performs the sealing function between the low pressure inside the rotating body 3 on the one side, and the atmospheric pressure in the hollow shaft 13 on the other side. The evaporator casing 2 runs on bearing 17 on the feed pipe 6 via a spoke wheel 16, at its opposite end from the drive.

The housing 1, at its end away from the drive, is fixed to the feed pipe 6 by way of its face 7, and at its end near the drive its face 18 is joined to the hollow shaft 13 by means of a bearing 19. Closer to the interior of the housing 1 a seal 20 is provided next to the bearing 19, by which the bearing 19 is sealed off from the heating space 21.

As shown at the bottom of FIG. 1, a wiper system is provided in this method of execution, which is distributed around the circumference of the rotating body 3. There are three wiper blades 22 evenly distributed over the circumference of the rotating body 3. The wiper blades 22 can be set in such a way that they touch the surface of the evaporator casing on which the process material runs, or that they keep a small distance from it.

By means of the planetary gear 5, the relative revolutions of the central shaft 4 and the hollow shaft 13, and thereby of the rotating body 3 and/or the feed distributor 8 and evaporator casing 2, can be tuned in such a way that, between these rotating machine parts, there is no relative speed (differential rotation number per unit time =0) or that there is a greater or lesser relative speed in one direction or the other.

The housing 1 is divided into a heating space 21 and vapor space 24 by a seal 23 which rests on the outside of the evaporator casing at the end away from the drive. The heating space 21 has a connecting piece 25 at the top for the intake of heating steam, and at the bottom a connecting piece 26 for the outlet of the condensate that forms.

Several spray tubes 27 pass through the face 18 into the heating space 21, where they are fitted with spray nozzles which spray the rotating evaporator casing with free jets of a liquid heating medium.

In the face 7 of the housing 1 away from the drive there is a connecting piece 29 for the evacuation of the vapors formed. In addition there is a connecting piece 30 to run off the evaporated concentrate, or end product, which leaves the evaporator casing 2 through drilled holes 31 and is flung against the wall of the housing 1 within the vapor space 24.

When in use, the evaporator case 2 and the rotating body 3 and/or the feed distributor 8 are preferably made to rotate in the same direction at the same or only slightly different rotational speed, so that the wiper system glides over the surface of the evaporator 2 that is in contact with the process material, with relatively small difference in rotational speed, keeps it clean and at the same time determines the course of the stream of the process material. The material to be evaporated is introduced through the feed pipe 6 in the direction of the arrow 32. The process material moves in the direction of the arrows 33, 34 all the way to the radially exterior edge of the feed distributor 8. From there it is flung off through drilled holes 35 onto the inside of the evaporator casing 2. It then moves in the direction of the arrows 36 to the end of the evaporator casing 2 away from the drive, and eventually leaves the evaporator casing through the drilled holes 31. The finished product or concentrate is drawn off in the direction of the arrow 37.

Figure 2:
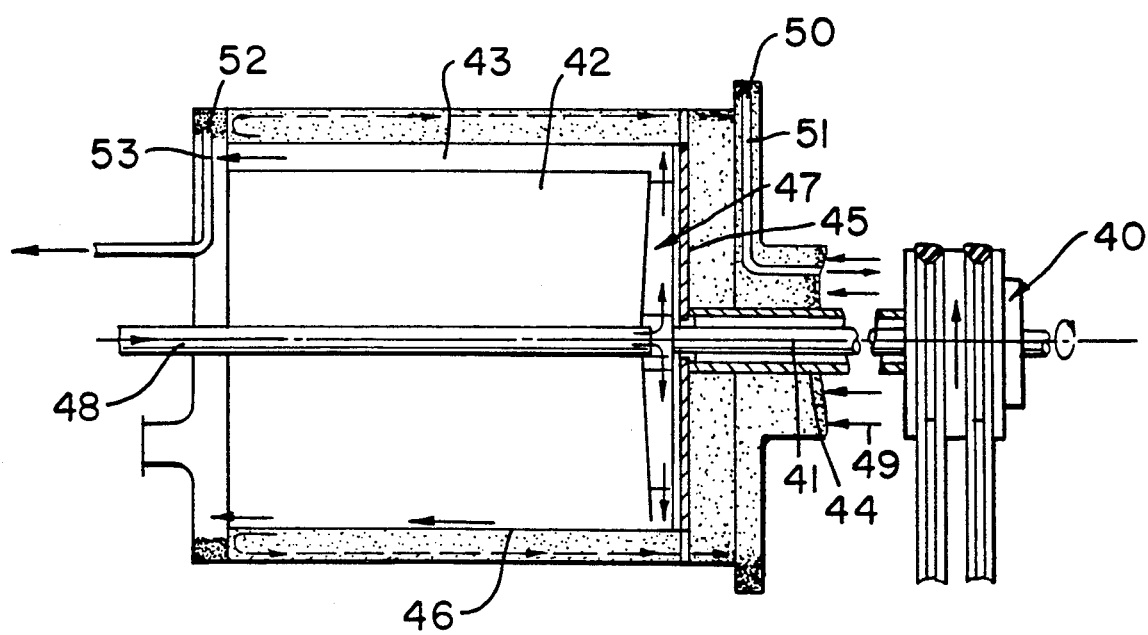
FIG. 2 shows a second method of execution of the thin film evaporator according to this invention, in which the evaporator casing is heated by steam.

In correspondence to the previously described method of execution, the thin film evaporator according to FIG. 2 has a planetary gear 40 which drives a rotating body 42 with wiper elements 43, as illustrated near the top of FIG. 2, by way of a horizontally running central shaft. Furthermore, a hollow shaft 44 proceeds from the planetary gear 40, and it is joined to a floor plate 45 of a cylindrical evaporator casing 46 with the same horizontal axis. Also, as shown in FIG. 2, there is a feed distributor 47, into which runs a feed pipe 48. In this method of execution steam is introduced, in the direction of the arrows 49, into a housing that surrounds the evaporator casing 46 and rotates with it, for the purpose of heating the evaporator casing 46. This steam cools on the outside wall of the evaporator casing and condenses. The condensate is flung off onto the housing wall and flows, in accordance with the arrows, axially to a circular cupped space 50, where it exits through a discharge tube 51. The concentrate collects, at the end of the thin film evaporator away from the drive, in the circular cupped space 52 and it is similarly drawn off by the discharge tube 53. Within the end of the evaporator casing away from the drive there is also a vapor outlet which is not shown.

According to an embodiment shown at the bottom of FIG. 2, no rotating body, and therefore no wiper system are provided. The central shaft 41, accordingly, drives only the feed distributor 47.

The illustrated and described methods of execution are similar especially in that they have a cylindrical evaporator casing which rotates on a horizontal axis. Along with that, the process material is moved onto the end of the evaporator casing near the drive by a feed distributor. As a result, at this location, there appears an increased thickness of the process material layer. Solely on account of the rotational frequency and the diameter of the evaporator casing, a centrifugal-hydrostatic force is set up for the process material in the direction away from the drive, which leads to its distribution and axial movement. This distribution and transport mechanism of the process material from the drive end to the other end of the evaporator casing, determines the retention time of the material on the casing and, along with that, the time in which the more or less thin layer material is acted upon thermally, in particular. The optimal retention time of the process material is specific for each material. It can be set specifically with this thin film evaporator by choosing the corresponding rotational frequency of the evaporator casing and the feed distributor. Further fine tuning can be achieved by the suitable application of the process material onto the evaporator casing by the appropriately designed feed distributor and by means of a stabilizing action of the wiper elements, which determines the course of the flow.

I claim:

1. A thin film evaporator for the evaporation of solutions, colloids and suspensions, comprising:
   a housing having an exit for removal of vapor and an exit for removal of concentrate,
   a heatable, rotatable, evaporator casing within said housing having an interior cylindrical surface whose cylindrical axis is horizontally positioned,
   a feed distributor whose distal edge is proximate to the interior surface of the evaporator casing,
   a hollow pipe, for the feed into the evaporator of material to be evaporated,
   a portion of said pipe being disposed inside the evaporator casing and extending substantially through the length of the evaporator casing, and having its axis coaxial with the cylindrical axis of the evaporator casing,
   one end of the evaporator casing being rotatably supported by the feed pipe,
   the other end of the feed pipe communicating with said feed distributor,
   a rotatable member located within the evaporator casing and having an axis of rotation that is coaxial with the cylindrical axis of the evaporator casing,
   at least one wiper element rotating with the rotatable member and positioned adjacent the interior surface of the evaporator casing,
   the rotatable evaporator casing and the rotatable member being attached to a drive by a common planetary gear,
   whereby the rate of rotation of the said casing and the rate of rotation of the said rotatable member can be selectively set to be the same as or to be different from each other.

2. The thin film evaporator of claim 1 wherein the distal edge of the feed distributor is located not more than about 2 cm from the interior surface of the evaporator casing.

3. The thin film evaporator of claim 1 wherein the feed distributor comprises a floor plate and a conical cover plate disposed coaxially with the floor plate, whereby the floor plate and the cover plate form a radially exterior ring opening.

4. The thin film evaporator of claim 3 wherein at least the floor plate portion of the feed distributor rotates with the rotatable member.

5. The thin film evaporator of claim 1 wherein the at least one wiper element touches the interior surface of the evaporator casing.

* * * * *